(12) United States Patent
Jibbe et al.

(10) Patent No.: US 8,473,645 B2
(45) Date of Patent: Jun. 25, 2013

(54) VARYING HOST INTERFACE SIGNALING SPEEDS IN A STORAGE ARRAY

(75) Inventors: Mahmoud K. Jibbe, Wichita, KS (US); Arunkumar Ragendran, Bangalore (IN); Britto Rossario, Bangalore (IN); Senthil Kannan, Pondicherry (IN)

(73) Assignee: LSI Corporation, San Jose, CA (US)

( * ) Notice: Subject to any disclaimer, the term of this patent is extended or adjusted under 35 U.S.C. 154(b) by 84 days.

(21) Appl. No.: 13/083,864

(22) Filed: Apr. 11, 2011

(65) Prior Publication Data
US 2012/0260007 A1 Oct. 11, 2012

(51) Int. Cl.
*G06F 13/00* (2006.01)
(52) U.S. Cl.
USPC .......................................................... 710/33
(58) Field of Classification Search
None
See application file for complete search history.

(56) References Cited

U.S. PATENT DOCUMENTS

| | | | |
|---|---|---|---|
| 6,829,643 B1 * | 12/2004 | Tobe et al. ..................... | 709/226 |
| 7,058,826 B2 | 6/2006 | Fung ............................. | 713/300 |
| 7,228,441 B2 * | 6/2007 | Fung ............................. | 713/300 |
| 2009/0199026 A1 * | 8/2009 | Kimmel et al. ............... | 713/320 |
| 2010/0142075 A1 | 6/2010 | Sanghvi ......................... | 360/39 |

* cited by examiner

*Primary Examiner* — Henry Tsai
*Assistant Examiner* — Juanito Borromeo
(74) *Attorney, Agent, or Firm* — Christopher P. Maiorana, PC (57) ABSTRACT

An apparatus comprising an interface circuit and a controller. The interface circuit may be configured to calculate a speed signal in response to data traffic measured over a network. The controller may be configured to present and receive data from an array in response to (a) the speed signal and (b) one or more input/output requests. The interface circuit may generate the speed signal in response to a plurality of predetermined factors. The controller may present and receive the data at one of a plurality of speeds in response to the speed signal.

20 Claims, 7 Drawing Sheets

VARYING HOST INTERFACE SIGNALING SPEEDS IN A STORAGE ARRAY

FIELD OF THE INVENTION

The present invention relates to storage devices generally and, more particularly, to a method and/or apparatus for implementing varying host interface signaling speeds in a storage array.

BACKGROUND OF THE INVENTION

Conventional enterprise storage arrays are commonly power aware (or power efficient) to address the overall increase in data center power specifications. One conventional power efficiency technique is to monitor an activity span (i.e., active/idle) during an array operation. Certain functional blocks are placed in identified low power states (i.e., a serial-ATA link partial/slumber).

Considerable power consumption differences exist between a physical layer device (i.e., PHY) driving an interface at a fastest supported speed versus a next fastest supported speed. According to the Small Computer Serial Interface (i.e., SCSI) Trade Association, power ratings are 20% less for a serial attached SCSI (i.e., SAS) PHY signaling at 6 gigabits per second (i.e., Gbps) versus 3 Gbps. For a x4 SAS port, the compared data is expected to be even less while operating the link at 1.5 Gbps.

A power bandwidth ratio is a functional aspect of storage arrays that are being closely driven in the industry. The bandwidth ratio (i.e., watts/bandwidth) is defined as the power in watts dissipated while achieving a bandwidth in Gbps. The interfaces drive the data at a high raw bandwidth while the effective data rate achieved is largely determined by the application load from the host and back-end components within a storage array. Most applications do not saturate the available raw bandwidth of the storage interface.

It would be desirable to implement a storage array that reduces interface signaling speeds when an application could use a slower speed without performance degradation. The reduced speed may reduce overall power consumption in an effort toward achieving environmentally friendly storage.

SUMMARY OF THE INVENTION

The present invention concerns an apparatus comprising an interface circuit and a controller. The interface circuit may be configured to calculate a speed signal in response to data traffic measured over a network. The controller may be configured to present and receive data from an array in response to (a) the speed signal and (b) one or more input/output requests. The interface circuit may generate the speed signal in response to a plurality of predetermined factors. The controller may present and receive the data at one of a plurality of speeds in response to the speed signal.

The objects, features and advantages of the present invention include providing varying host interface signaling speeds in a storage array that may (i) vary host interface signaling speeds, (ii) be connected to a storage array, (iii) provide greener (e.g., power efficient) storage, (iv) use variable host interface speeds and dynamically switching between the interface speeds during an array operation, (v) use variable host interface speeds to achieve a low power mode operation, (vi) use target array performance data to change the host interface speeds, (vii) use time of day to operate the array in different host interface speed modes, (viii) implement functionality to trigger the link speed change from a management layer and/or (iv) define and implement host interface speed rollback.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
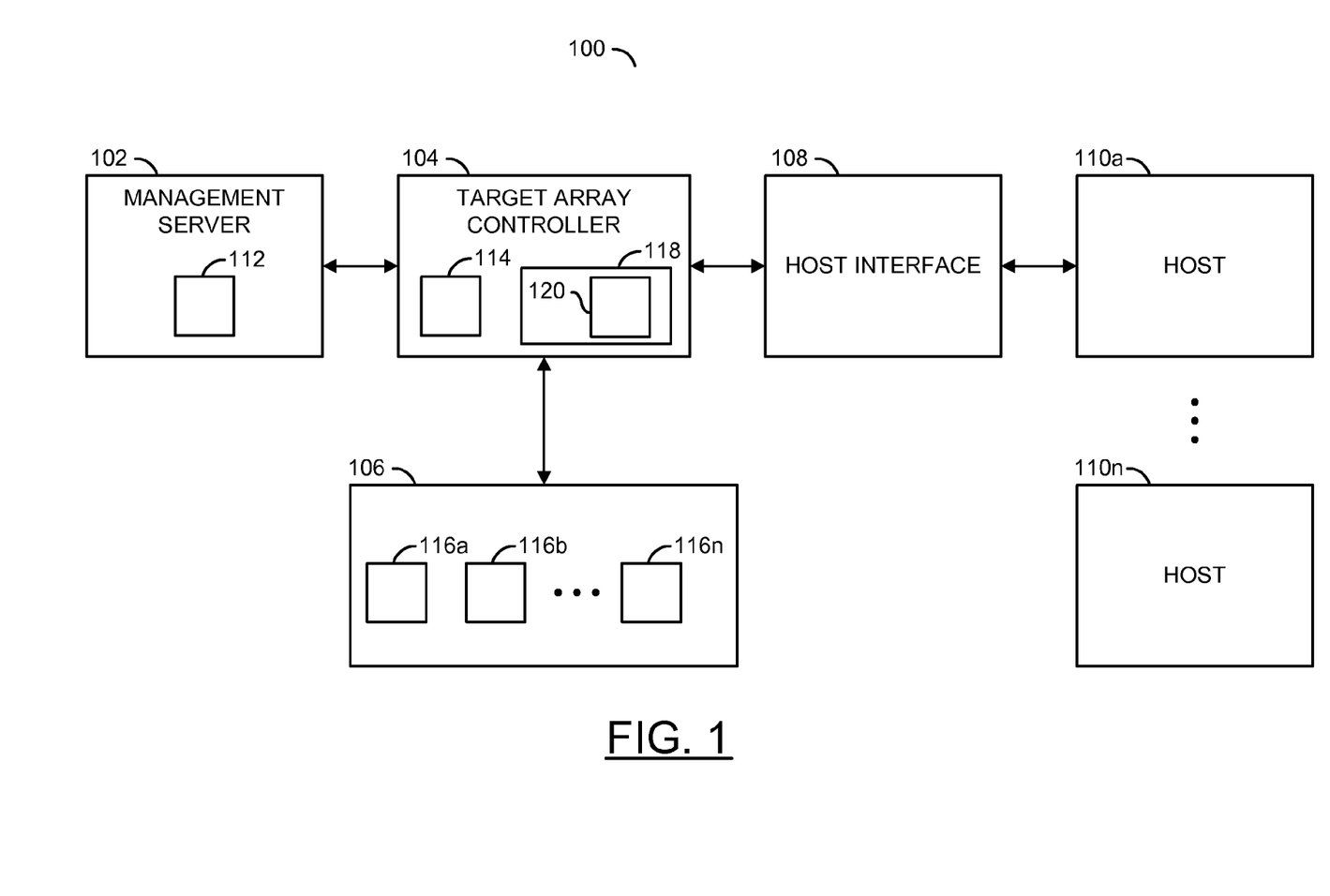
FIG. 1 is a block diagram illustrating a context of the present invention.

Referring to FIG. 1, a block diagram of a system 100 is shown illustrating a context of the present invention. The system 100 generally comprises a block (or circuit) 102, a block (or circuit) 104, a block (or circuit) 106, a block (or circuit) 108 and one or more blocks (or circuits) 110a-110n. The circuits 102 to 110n may represent modules and/or blocks that may be implemented as hardware, firmware, software, a combination of hardware, firmware and/or software, or other implementations.

The circuit 102 may be implemented as a management server (or computer or processor). The circuit 104 may be implemented as a controller. In an example embodiment, the circuit 104 may be a target array controller. The circuit 106 may be implemented as an array. In an example embodiment, the circuit 106 may be implemented as a target storage array. The circuit 108 may be implemented as a host interface. Each of the circuits 110a-110n may be implemented as a host. The hosts 110a-110n may access the storage array 106 through the controller 104 and the interface 108. The host interface 108 may communicate with the hosts 110a-110n via a communications network. The management server 102 may include software (e.g., firmware, program instructions, code, etc.) 112. The software 112 may be implemented as a management application. The controller 114 may include one or more registers 114. The array 106 may include a number of storage devices 116a-116n. The storage devices 116a-116n may be implemented as hard disc drives (e.g., HDDs), flash drives, or other appropriate types of network storage devices.

The system 100 may monitor the array 106 to determine whether the array 106 is achieving efficient data transfer. The system 100 may determine if the array 106 is handling a data load distributed across a time window (e.g., a backup window that may stretch across hours). The system 100 may downgrade a link speed of the host interface 108 to the next lower supported speed. Key factors for improved efficiency include power consumption differences, power bandwidth ratio, raw data rate and/or effective data rate. Improved power bandwidth ratio and/or control may be achieved using dynamic link data rate reduction. The speed information may be passed and/or queried by the application 112 via an application program interface (e.g., API) in the target array controller 104.

The system 100 may allow a storage administrator (or operator or technician) to (i) define a performance threshold above/below which the host interface speeds may be varied and/or (ii) determine a time of day during which the target array may negotiate to run at a lower speed (and thus be in a power saving mode). The performance thresholds and times of day may be stored in the server 102.

Capture and/or analysis of performance data may be implemented by a software module on the management server 102 to minimize overhead on the controller 104 and/or array 106. A rollback action may be defined so that the target array controller 104 may rollback to the high speeds as the target array controller 104 detects the data transfer patterns are trending higher toward a set threshold. The system 100 may preserve one or more low power states defined by one or more interface standards (e.g., partial/slumber in serial-ATA, etc.). The interface 108 may switch to operate in one of a multiple number of supported speeds. The interface 108 may downscale to a slower speed while still entering and/or exiting low power modes within that negotiated speed. The system 100 may be applied to any kind of high speed host interface between the storage array 106 and the host 110a-110n using one or more protocols (e.g., Fibrechannel, serial attached SCSI (e.g., SAS), internet small computer system interface (e.g., iSCSI), etc.).

Decision making logic to enter/exit a supported lower speed and/or rollback to a higher speed may be implemented at the host layer (e.g., the controller 104) to minimize the overhead seen at the array 106. An option may be implemented to enable/disable a dynamic host interface rate scaling feature in response to a rate disable command in a disabled state (or mode or condition). Such a feature may allow the array 106 to run at the negotiated normal link rate in high performance/mission critical application scenarios. The dynamic rate scaling feature may be enabled while the rate disable command is in an enabled state (or mode or condition).

The array 106, and the host interface 108 driving the array 106, may negotiate the highest possible speed for the host interface 108 during the data transfer. During a real time data transfer in an end user environment, the application 112 connected to the controller 104 may fetch (or receive) performance counter statistics from the host interface 108 at regular polling intervals. The application 112 may implement decision logic that may compare real time data to predefine performance thresholds during a set monitoring window based on real time performance trends. The server 102 may direct the array 106 to vary a speed of operation of the host interface 108. The variation may be directed by the application 112 based on the predefined criteria (e.g., time of day, etc.). Various topology elements may be implemented in the communication flow.

The server 102 may host the application 112. The server 102 may also let a user-defined performance based, a time of day, and/or one or more application load-based link speed variation rules. The server 102 may also fetch the performance data from performance counters implemented in the controller 104. The server 102 is generally responsible for sending one or more relevant management (or control) signals to the array 106 in order to downgrade/upgrade the link speed of the array 106. The management controls may be transferred from the application 112 to the array 106 via the controller 104.

Firmware (e.g., software, program instructions, code, etc.) 118 in the controller 104 may implement the performance counters 120 (one shown) based on link downgrade rules. The performance counters 120 may be based on host channel specific rules. The array 106 may implement multiple (e.g., two) host channel performance metric, including a read/write performance measured in megabytes per second (e.g., MB/s) and an input/output performance measured in input/output operations per second (e.g., IOPs/sec). However, other performance metrics may be adopted to meet the criteria of a particular application. Other metrics may be used within available overhead constraints (e.g., volume group specific performance data etc.).

The registers 114 (one shown) may be implemented as one or more physical interface registers 114 and one or more rollback registers 114. The registers 114 may be implemented in the target array controller 104. The physical registers 114 may be programmed to determine the speed at which the host interface links are driven. The rollback registers 114 may be programmed with the last negotiated speed. If one or more of the hosts 110a-110n and/or the array 106 is unable to negotiate the downgraded speed, the hosts 110a-110n and the target array 106 may roll back to the last negotiated speed as stored in the rollback registers 114. In case of exceptions, a controller 104 reset, or a host interface controller 104 (e.g., HIC) replacement, the array 106 may be implemented to refer to the rollback registers 114. The rollback registers 114 may contain the last known negotiated speed and/or drive of the corresponding host channel at the last known speed.

In one example, multiple (e.g., two) hosts channel specific performance metrics may be implemented. Performance overheads in monitoring the performance data may be considered. A decision process (to be described in connection with FIGS. 4 and 5) may be designed accordingly. Performance quadrants may be defined based on a number of interface transfer speeds that may be varied. For SAS/FC type transfers, three transfer rate quadrants may exist.

Figure 2:
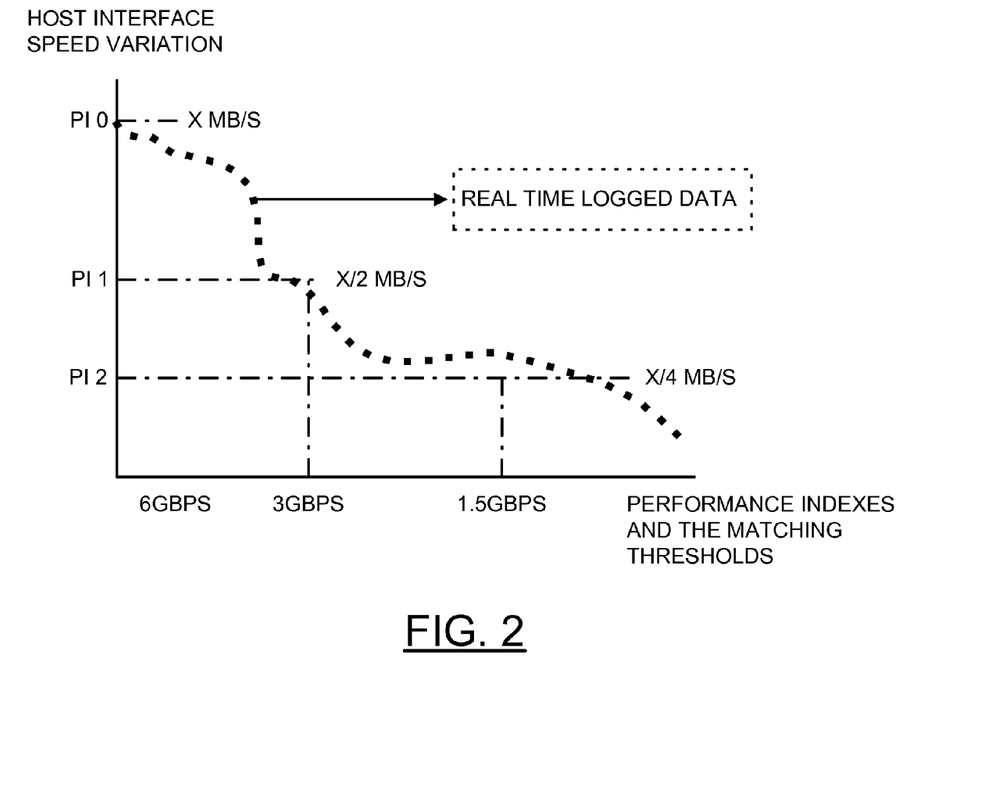
FIG. 2 is a graph of speed variations versus a target performance threshold.

Referring to FIG. 2, a graph of speed variations versus a performance threshold is shown. The speed variations of the host interface 108 may vary with respect to the performance threshold. The speed variations may include read or write/combined aggregate bandwidth per second. When the array 106 is designed and/or produced, a peak bandwidth capability is generally determined by varied benchmarks running in a pre-defined, unconstrained configuration setup. Generally, a best achieved bandwidth rate may be used as a baseline comparison threshold to compare with real time performance data in an end user environment that is monitored using performance monitors. A number of comparison thresholds that are generally defined for a given performance metric may be based on the number of variable speeds of a given host interface 106. For example, on an SAS2 link-based array 106, a number of comparison thresholds may be three, and so the number of speed variants may also be three.

By way of example for a given implementation of the array 106, if a bandwidth of X MB/s is a best possible bandwidth laid out in the specifications and the host interface 108 speed of the array 106 may be set at three different levels, the array 106 generally creates performance thresholds/indexes (e.g., PI(0), PI(1) and PI(2)). The threshold/index PI(0) may correspond to the bandwidth of X MB/s. The threshold/index P(1) generally corresponds to a bandwidth of X/2 MB/s. The threshold/index P(2) may correspond to a bandwidth of X/4 MB/s.

In an end user scenario, the host interface 108 and the array 106 may negotiate and run at the highest supported link speed (bandwidth). The performance counters 120 in the controller 104 may log the transfer rate in units of megabytes per second. While the logged transfer rate is both (i) less than the bandwidth X MB/s (corresponding to the highest performance threshold PI(0)) and (ii) greater than the bandwidth X/2 MB/s, the host interface 108 may run at the highest possible speed (e.g., 6 Gbps in the example SAS2 link). While the logged transfer rate is both (i) less than the bandwidth X/2 MB/s (corresponding to the performance threshold PI(1)) and (ii) greater than the bandwidth X/4 MB/s, the host interface 108 may be scale down the link speed to the next supported speed (e.g., 3 Gbps in the example SAS2 link). While the logged transfer rate is below the bandwidth X/4 MB/s, the host interface 108 may scale down to the next and last supported speed and remain in the last link rate. (E.g., 1.5 Gbps in the example SAS2 link). The reverse logic generally applies when the transfer rate starts trending upwards.

Figure 3:
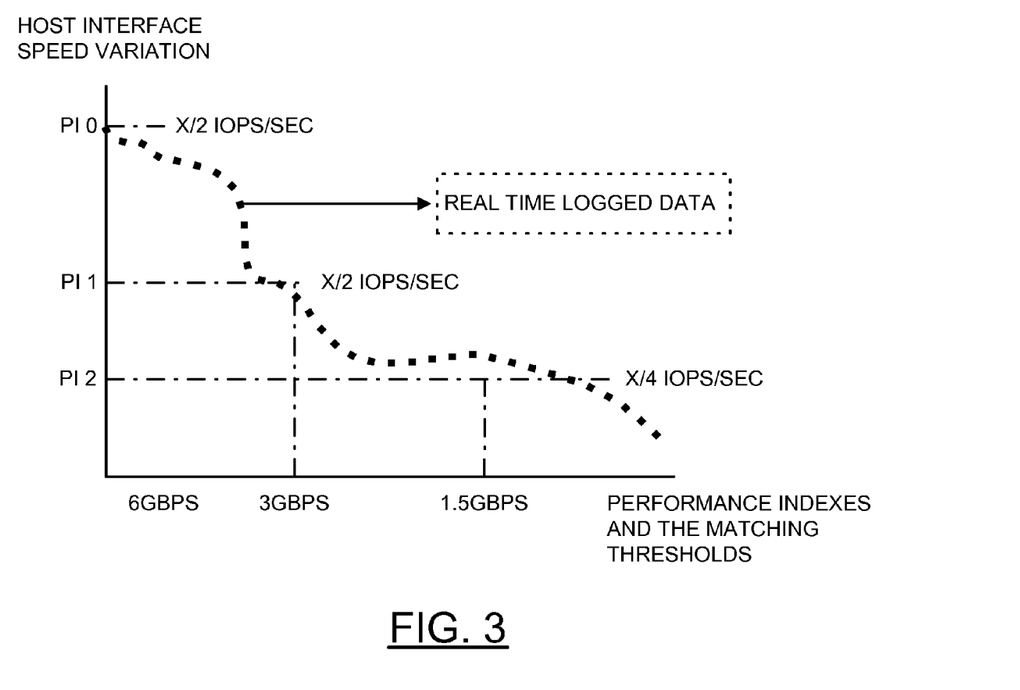
FIG. 3 is a graph of speed variations versus a performance threshold.

Referring to FIG. 3, a graph of speed variations versus a performance threshold is shown. The number of input/output operations per second (e.g., IOPs/sec) may be measured at the host channel interface. The number of input/output operations per second may be another performance metric laid out in the specifications of the array 106. Other performance metrics may be appropriate for the performance based on the downscaling methodology of a particular implementation. For example, a storage vendor may specify the input/output operations per second capability of the array 106 in a specification sheet that is arrived after extensive benchmarking and performance tuning and optimization of the functional blocks (e.g., cache) in the array 106. The specified input/output operations per second capability may be defined as a base performance threshold. Similar to the read/write performance approach, further input/output operations per second thresholds based on the number variable speed settings supported by the host interface link may be defined.

In a given storage array (e.g., array 106), consider X IOPs/sec to be the best possible input/output operation performance according to the specifications and the speed of the host interface 108 may be set at three different levels. The array 106 may create the performance threshold X IOPs/sec, a performance threshold of X/2 IOPs/sec, a performance threshold of X/4 IOPs/sec and so on.

In an end user environment on a real time load, the array 106 may not achieve the best possible input/output performance as laid out in a specification (e.g., due to load patterns, application deadlocks/snag, etc.). In such circumstances, the performance data driven link may apply down scaling in the following manner.

The data transfer may be driven between the hosts 110a-110n and the storage array 106. The performance counters 120 may log the input/output performance data. The performance monitoring logic 112 may compare the real time logged information across the preset input/output performance thresholds over a considerable time duration. The hosts 110a-110n and the target array 106 may negotiate to run at the best (e.g., fastest) possible speed.

Where the logged input/output performance is both (i) less than or matching the threshold X IOPs/sec and (ii) greater that the threshold X/2 IOPs/sec, the link speed downscaling generally does not occur and the link may run at the highest supported speed (e.g., 6 Gbps in the example SAS2 link). While the logged input/output performance is both (i) less than or matching the threshold X/2 IOPs/sec and (ii) greater than the threshold X/4 IOPs/sec, the link speed generally downgrades to the next supported speed (e.g., 3 Gbps in the example SAS2 link). While the logged input/output performance is less than the threshold X/4 IOPs/sec, the link speed may downgrade to the last possible speed (for e.g., 1.5 Gbps in the example SAS2 link).

Figure 4:
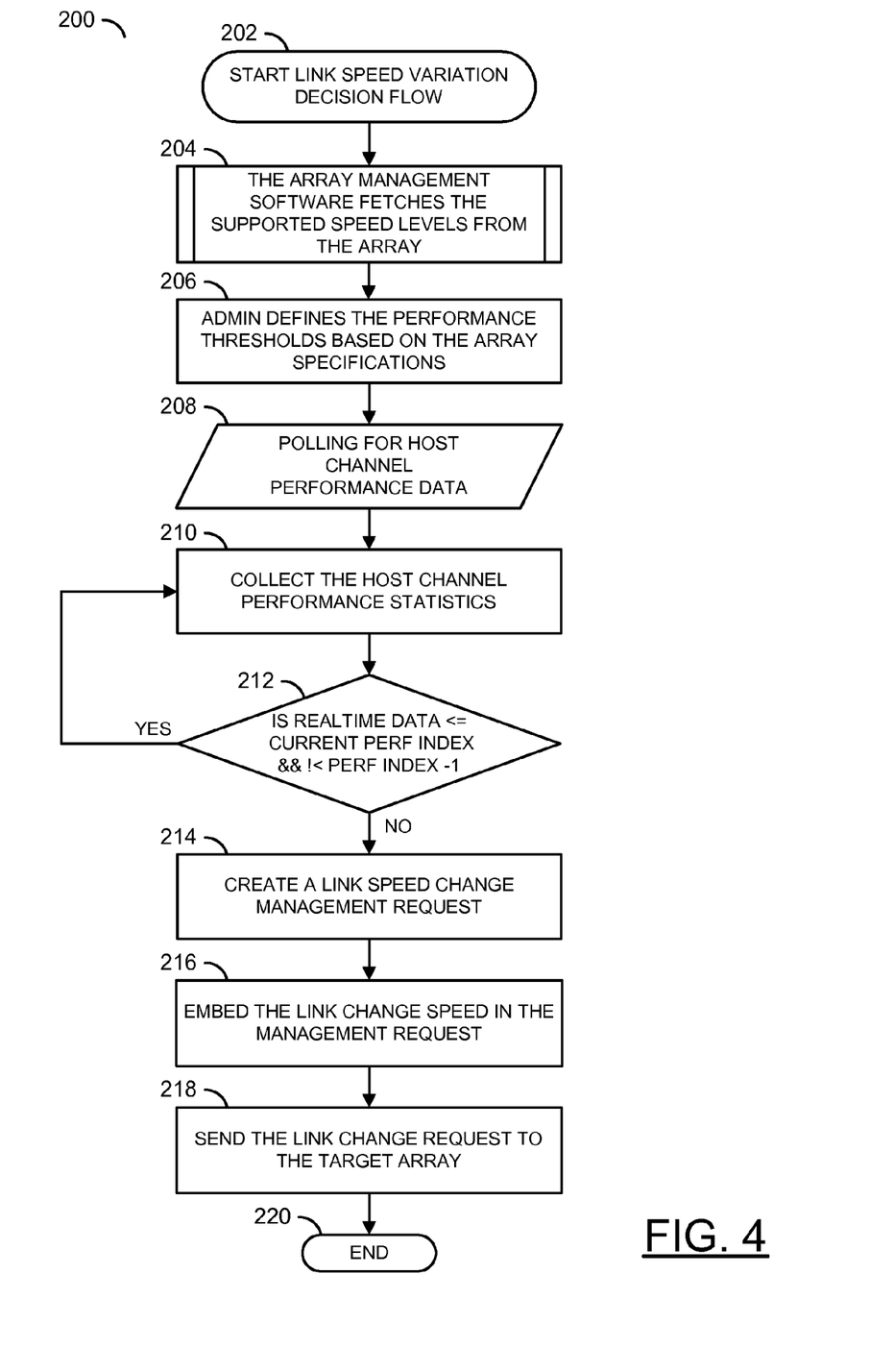
FIG. 4 is a flow diagram of a method to monitor performance.

Referring to FIG. 4, a flow diagram illustrating a method (or process) 200 is shown. The method 200 may be implemented as one or more computer readable instructions stored in the block 112. The method generally comprises a step (or state) 202, a step (or state) 204, a step (or state) 206, a step (or state) 208, a step (or state) 210, a decision step (or state) 212, a step (or state) 214, a step (or state) 216, a step (or state) 218, and a step (or state) 220.

The method 200 may monitor performance statistics. The method 200 may start at the state 202. The state 202 may start a link speed variation decision flow. The link speed may be varied upwards or downwards. In the state 204, software 112 may fetch supported speed levels from the array 106. In the state 206, performance thresholds based on the array specifications and defined by an administrator may retrieved. The state 208 may poll host channel performance data. The state 210 may collect host channel performance statistics. The decision state 212 may monitor upward or downward trending performance data. The state 212 may determine if real time data (i) is less than or matches (e.g., <=) the current performance index and (ii) (e.g., &&) is not less than (e.g., !<) the current performance index-1. If so (e.g., the YES branch of decision state 212), the method 200 may move back to the state 210. If not (e.g., the NO branch of decision state 212), the method 200 generally moves to the state 214. The state 214 may create a link speed change management request. The state 216 may embed a requested new link speed in the management request. The state 218 may send the link change request to the array 106 for implementation. The state 220 may end the method 200.

The speed of the host interface 108 may be varied over time. In an example, storage administrators may use the server 102 to setup a set of rules based on time of day settings of a configuration of the array 106. Load patterns generally vary throughout the day. For example, an exchange server (e.g., one or more of the hosts 110a-110n) may send and/or receive data at a much faster rate at the beginning of the day than at the end of day. In another example, an online transaction processing (e.g., OLTP) application executing in one or more of the hosts 110a-110n may transfer data to the array 106 during peak working hours rather than end of the day when the array 106 is performing less critical/less bandwidth intensive actions, such as book keeping of records. Scheduled backups performed by one or more hosts 110a-110n, such as running overnight backups, may also run across a large time window in order to perform scattered data transfers. The application 112 may monitor ongoing data transactions and allow the data transfers to complete before refusing any data requests. Communication between the array 206 and one or more of the hosts 110a-110n may be disconnected or reconnected. The hosts 110a-110n may reconnect and renegotiate the link speed. The array 106 may be programmed to run at a lesser speed as appropriate to accommodate the available bandwidth.

In the state 206, the application 112 may poll host interface 108 to gather the performance statistics at set polling intervals. The application 112 may detect downward trending performance data based on a pre-defined performance threshold, a time of day identifier, and/or an application identifier. In the state 218, the application 112 may send the link speed down management signals to the target array 106.

The array 106 may complete data transfers in transit and wait for a next possible window before breaking existing connections. Once a connection is re-opened, the transfer speeds may be determined. The controller 104 may store the last supported link speed to the rollbacks registers 114. Data stored on the rollback registers 114 may allow rollback to the last supported link speed. The controller 104 may program the physical registers 114 to the next supported speed downwards. By way of example, an SAS link may be downgrade the speed from 6 Gbps to 3 Gbps and subsequently further downgrade from 3 Gbps to 1.5 Gbps. The hosts 110a-110n may connect to the array 106 using standard open connection and/or speed negotiation protocol. The array 106 may behave as a low speed entity during the speed negotiation process. The hosts 110a-110n and the array 106 may communicate over the host interface 108. The method 200 may allow the host interface 108 to run at a link rate lower than the highest link rate, resulting in a lower power connection. As subsequent data transfers occur over a time window, the performance counters 120 may be polled by the array management software (e.g., application 112) and follow the data transfer rate pattern. The performance counters 120 may also determine the link speed reduction and/or rollback to a higher supported speed.

Figure 5:
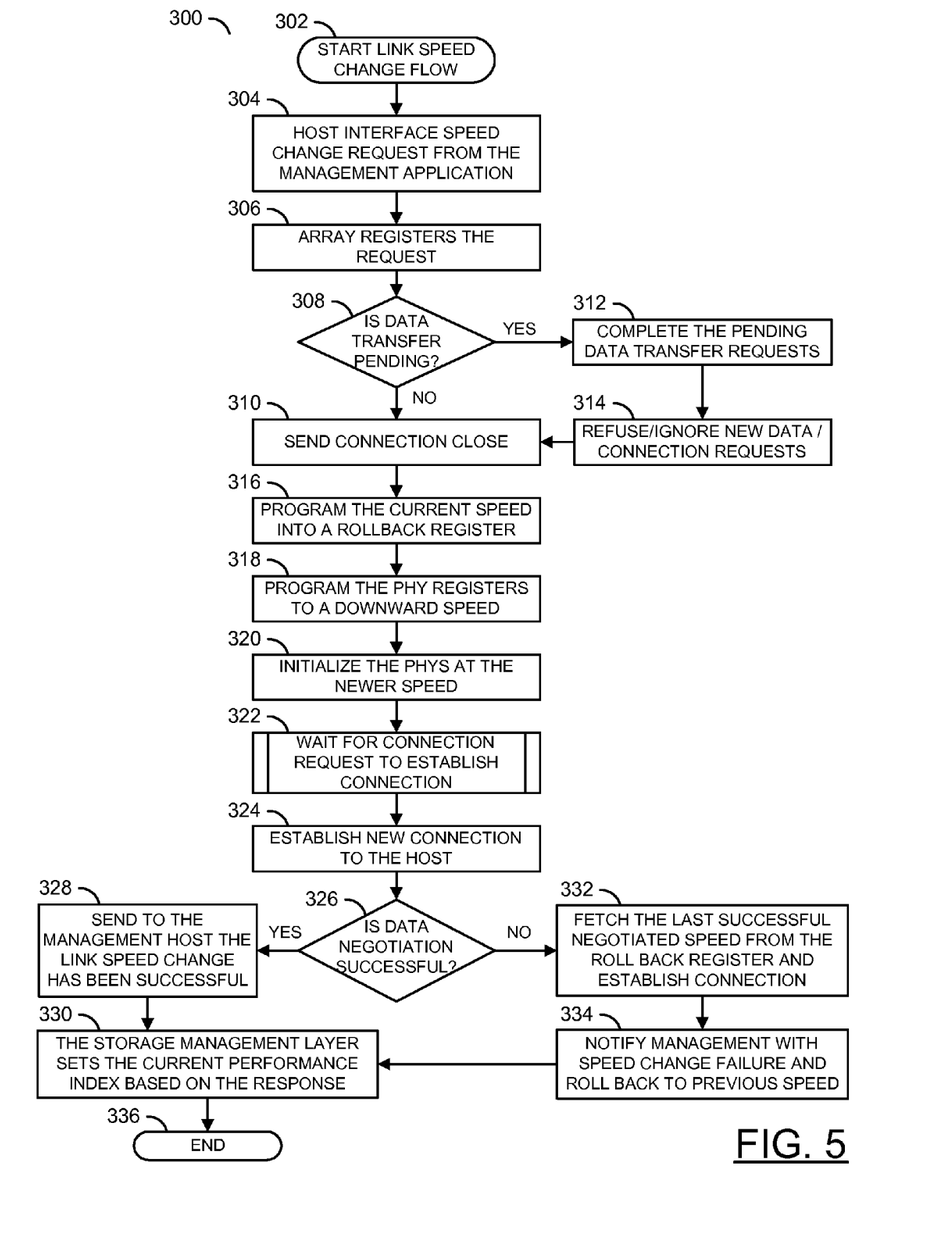
FIG. 5 is a flow diagram of a method to change operating speeds.

Referring to FIG. 5, a diagram illustrating a method (or process) 300 is shown. The method 300 generally comprises a step (or state) 302, a step (or state) 304, a step (or state) 306, a decision step (or state) 308, a step (or state) 310, a step (or state) 312, a step (or state) 314, a step (or state) 316, a step (or state) 318, a step (or state) 320, a step (or state) 322, a step (or state) 324, a decision step (or state) 326, a step (or state) 328, a step (or state) 330, a step (or state) 332, a step (or state) 334, and a step (or state) 336. The method 300 may be implemented by the controller 104 (e.g., the firmware 118).

The state 302 may be a start state. The state 302 may start a link speed change flow. In the state 304, a host interface speed change request may be received from the application 112. In the state 306, the array 106 may register the request. The state 308 may determine if a data transfer is pending. If one or more data transfers is pending (e.g., the YES branch of decision state 308), the method 300 generally moves to the state 312. If no data transfers are pending (e.g., the NO branch of decision state 308), the method 300 generally moves to the state 310. The state 312 may complete the pending data transfer requests. The state 314 may refuse/ignore new data/connection requests. Next, the method 300 moves to the state 310. The state 310 may send a connection close message and the method 300 may move to the state 316. The state 316 may program the current speed into the rollback registers 114. The state 318 may program the physical registers 114 to a newer downward speed. The state 320 may initialize the physical registers 114 at the newer speed. The state 322 may wait for a connection request to establish a connection. The state 324 may establish a new connection to the hosts 110a-110n. The state 326 may determine if a data speed negotiation is successful. If successful (e.g., the YES branch of decision state 326), the method 300 generally moves to state 328. If not successful (e.g., the NO branch of decision state 326), the method 300 may move to state 332. The state 328 may send to the management host (e.g., server 102) that the link speed change has been successful. In the state 330, a storage management layer of the application 112 may set the current performance index based on the response. For the unsuccessful link speed change, the state 332 may fetch the last successful negotiated speed from the rollback registers 114 and establish a connection. The state 334 may notify the management layer of the speed change failure and roll back to the previous speed. Next, the method 300 generally moves to the state 330. The state 336 may end the method 300.

Rollback may provide additional functionality to the system 100. The rollback feature may be implemented in the array 106 and the controller 104. The rollback feature may also vary the speed of the host interface 108. If the controller 104 is not able to negotiate a newer downward speed, the controller 104 may rollback to the last supported speed between the array 106 and the hosts 110a-110n. Rollback is also important for exception conditions while the controller 104 is being replaced and/or the controller 104 is being reset. Rollback may allow the communications between the array 106 and the hosts 110a-110n to be changed to the last know speed configuration. If performance thresholds are generally trending upwards, the link may read the rollback register 114 entries to program the physical registers 114 to the last supported speed levels.

The system 100 may deliver considerable power savings when the system is active and performing input/output operations. The methods 200 and/or 300 may also optimize the use of the available raw bandwidth by switching to a lesser bandwidth if the data rate does not utilize the initial higher bandwidth rate upon the offer. The performance thresholds defined may be based on the specified performance metrics capabilities of the array 106 in order to determine if the real-time performance data is trending upwards or downwards compared with the threshold value. The performance metrics may be used such that the array 106 capabilities are well utilized. The link speed variation based power saving may coexist with one or more existing protocol specific power saving modes (e.g., partial/slumber modes). For example, a 3 Gbps link in the partial/slumber mode generally dissipates lesser power than 6 Gbps link in the partial/slumber mode. The methods 200 and/or 300 may also address exception conditions to allow rollback to the last supported speed if the system may not perform a requested link speed change.

The performance of the statistics host channel interface 108 may provide a downgrade decision that may be based on adequate time intervals provided between subsequent switches of the interface speeds. An interval may be defined as the time interval during which the performance data crosses from a performance index threshold (e.g., N) to performance index threshold N−1. The array 106 may find a window between data transfers to drive the link downgrade feature. Multiple hosts 110a-110n may drive the array 106. While little or no traffic is in transit, the array 106 may be placed in a low speed mode.

The system 100 may be applicable to any storage topology where a host (e.g., host 110a) is driving a target controller (e.g., controller 104) over a high speed data interface. The system 100 may also be implemented where interface protocols support various link speeds and may be backward compatible with previous generation speeds. The performance counters (e.g., counters 120) may be implemented as a standard feature applicable across the available storage products. The decision logic and change triggers may be implemented in the application 112. The system 100 may deliver considerable power savings in the storage topologies and drive power efficiency across the data centers.

Figure 6:
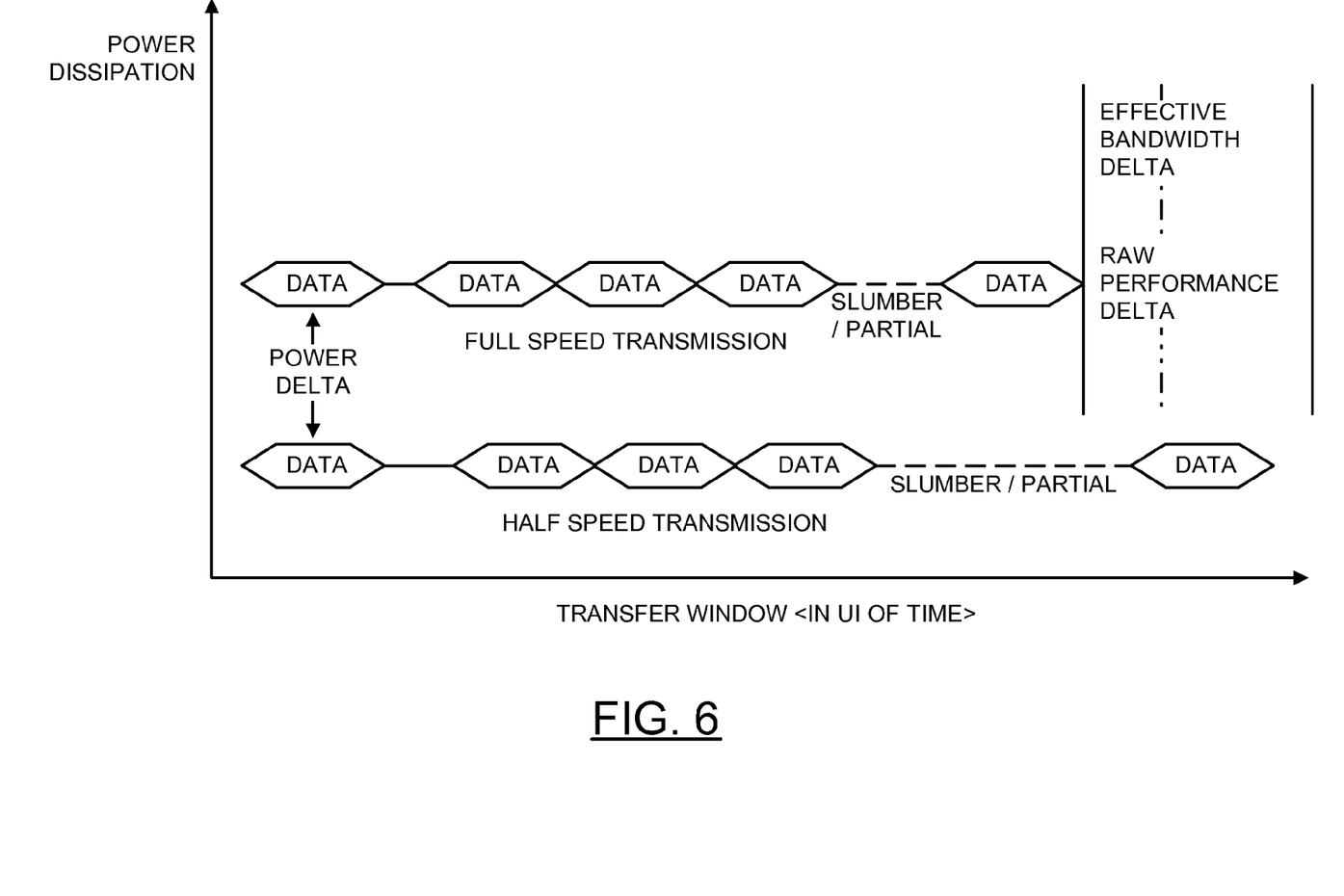
FIG. 6 is a graph of bandwidth rates.

Referring to FIG. 6, a graph of bandwidth rates is shown. For an application driving data transfer to storage devices (e.g., array 106), the application data transfer may be bursts of data activity followed by idle phases largely caused by snags in a host application layer or back end latencies within the storage devices. A high speed data interface may achieve a high bandwidth utilization during the data transfer phase. The high bandwidth may be known as raw bandwidth. However, while considering a larger time window during which an application drives the storage device (i.e., an online transaction processing application committing the transactions), the effective work done or the amount of data transferred per second (e.g., MB/s) may be far less than the available bandwidth (e.g., Gbps). Generally, application loads may not saturate the raw bandwidth and every application load may not use the full high bandwidth. Therefore, the host interface may be driven at a lesser supported speed. The lower speeds may save on power with minimal trade off on an effective data rate.

Figure 7:
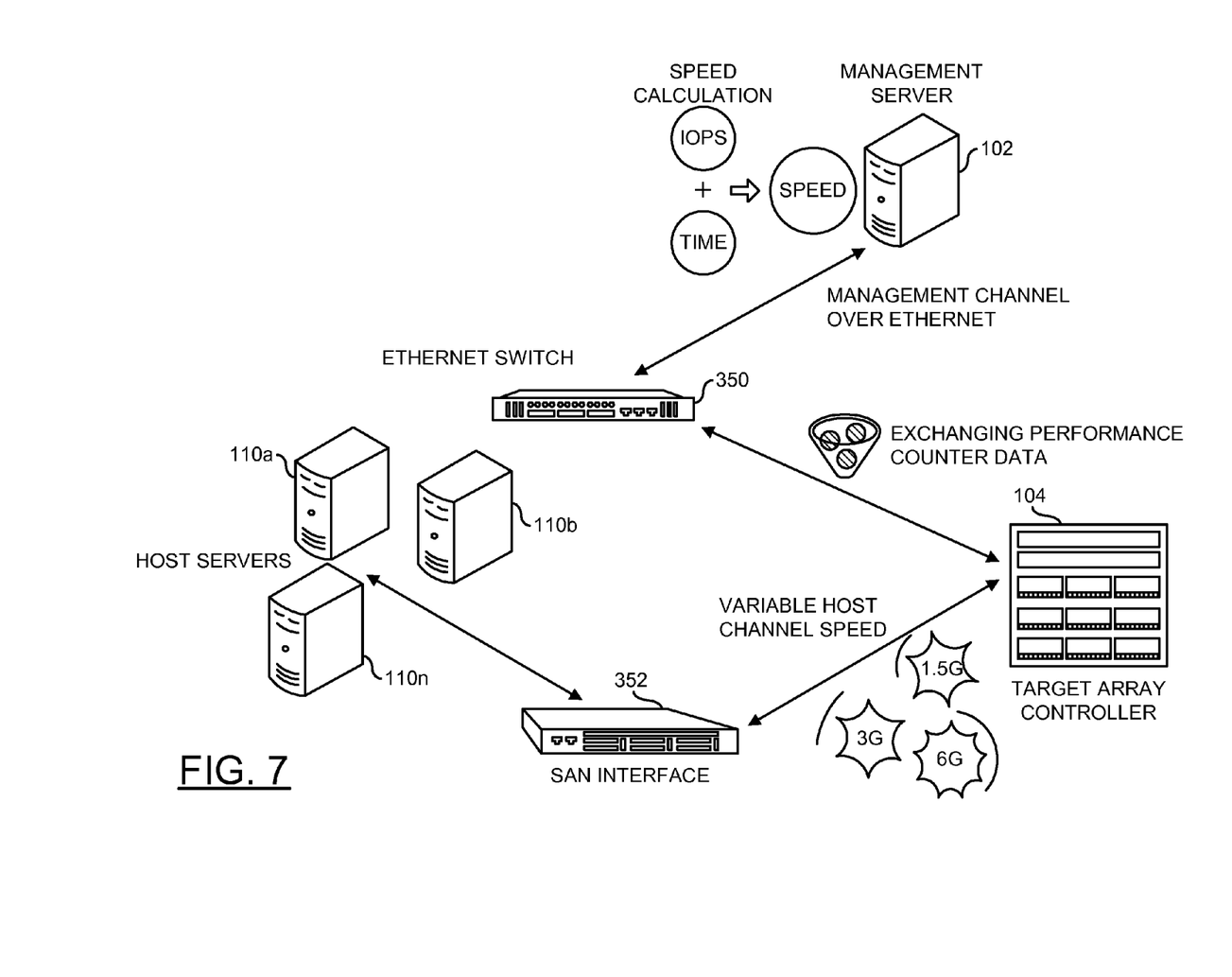
FIG. 7 is block diagram illustrating a typical end user environment.

Referring to FIG. 7, a block diagram illustrating a typical end user environment is shown. The diagram generally shows a typical storage area network environment. The environment generally comprises the server 102, the controller 104, the hosts 110a-110n, a block (or circuit) 350 and a block (or circuit) 352. The circuits 350 to 352 may represent modules and/or blocks that may be implemented as hardware, firmware, software, a combination of hardware, firmware and/or software, or other implementations.

The circuit 350 may implement an Ethernet switch. The switch 350 generally enables communications between the server 102 and the controller 104. The circuit 352 generally implements a storage area network interface circuit. The circuit 352 may enable communications between the hosts 110a-110n and the controller 104.

Data transfers generally happen between the hosts 110a-110n and the controller 104 via the circuit 352. Management of the assets may be conducted over an Ethernet network connecting the server 102 and the controller 104 via the switch 350. The speed variations may be adjusted between the hosts 110a-110n and the controller 104 (and subsequently the array 106). Decisions for the speed adjustments may be taken based on the logic implemented in the application 112 within the server 102. The decisions may be based on speed information gathered from the array 106 via the firmware 118 within the controller 104. The performance counters 120 may be managed by the firmware 118. Contents of the performance counters 120 may be transferred to the application 112 in the server 102 from time to time.

The functions performed by the diagrams of FIGS. 4 and 5 may be implemented using one or more of a conventional general purpose processor, digital computer, microprocessor, microcontroller, RISC (reduced instruction set computer) processor, CISC (complex instruction set computer) processor, SIND (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   an interface circuit configured to operate at one of a plurality of speeds in response to a speed signal;
   a controller configured to (a) present and receive data from an array in response to (i) said speed signal and (ii) one or more input/output requests, and (b) generate bandwidth performance statistics of data traffic measured over a network; and
   a computer in communication with said controller and configured to store one or more performance thresholds used to control said speed of said data, wherein (i) said computer generates said speed signal in response to a plurality of predetermined factors and (ii) said computer generates said speed signal in response to said bandwidth performance statistics such that said interface operates (i) at a speed sufficient to process said input/output requests and (ii) said speed is lower than a maximum speed to reduce resources.

2. The apparatus according to claim 1, wherein said interface circuit negotiates a highest possible speed for said speed signal.

3. The apparatus according to claim 1, wherein said predetermined factors include one or more of (i) power consumption differences, (ii) a power bandwidth ratio, (iii) a raw data rate and (iv) an effective data rate.

4. The apparatus according to claim 1, wherein said predetermined factors further include a performance threshold above/below which said speed signal is varied.

5. The apparatus according to claim 1, wherein said predetermined factors further include a time of day during which said array generates said speed signal at a higher/lower speed.

6. The apparatus according to claim 1, wherein said controller operates in a power savings mode.

7. The apparatus according to claim 1, wherein said interface circuit implements a rate scaling feature to allow said array to run at a determined speed in high performance applications.

8. The apparatus according to claim 1, further comprising a computer in communication with said controller and configured to store one or more performance thresholds used to control said speed of said data.

9. The apparatus according to claim 1, further comprising a computer in communication with said controller and configured to store a time of day during which said array negotiates to run at a lower of said speeds to save power.

10. The apparatus according to claim 1, wherein said apparatus is implemented as one or more integrated circuits.

11. A method for varying host interface signaling speeds in an array, comprising the steps of:
   (A) operating an interface at one of a plurality of speeds in response to a speed signal;
   (B) presenting and receiving data between a controller and said array in response to (i) said speed signal and (ii) one or more input/output requests;
   (C) generating bandwidth performance statistics of data traffic measured over a network; and
   (D) generating said speed signal in response to a plurality of predetermined factors and bandwidth performance statistics such that said interface operates (i) at a speed sufficient to process said input/output requests and (ii) said speed is lower than a maximum speed to reduce resources.

12. The method according to claim 11, further comprising the step of:
   changing said speed of said data in response to said data traffic crossing a performance threshold.

13. The method according to claim 11, further comprising the step of:
   stalling an adjustment of said speed signal while an existing one of said input/output requests is in progress.

14. The method according to claim 11, further comprising the step of:
   capturing and analyzing one or more performances of said data traffic.

15. The method according to claim 11, further comprising the step of:
   rolling back said speed of said data from a first of said speeds to a second of said speeds in response to an unsuccessful attempt to adjust said speed of said data from said second speed to said first speed.

16. The method according to claim 11, further comprising the step of:
   adjusting said speed signal downward while maintaining said array in a low power state.

17. The method according to claim 11, further comprising the step of:
   wherein said network comprises at least one of (i) a Fibre-channel network, (ii) a serial attached small computer system interface network and (iii) an internet small computer system interface network.

18. The method according to claim 11, further comprising the step of:
   deciding to adjust said speed of said data at a host layer of said controller to minimize an overhead of said array.

19. The method according to claim 11, wherein said speed of said data is held at a fixed one of said speeds in response to a disable command.

20. An apparatus comprising:
   means for operating an interface at one of a plurality of speeds in response to a speed signal;
   means for presenting and receiving data between a controller and an array in response to (i) said speed signal and (ii) one or more input/output requests;
   means for generating bandwidth performance statistics of data traffic measured over a network; and
   means for generating said speed signal in response to a plurality of predetermined factors and bandwidth performance statistics such that said interface operates (i) at a speed sufficient to process said input/output requests and (ii) said speed is lower than a maximum speed to reduce resources.

* * * * *